A. H. MEECH.
COMPOUND AIR COMPRESSOR.
APPLICATION FILED FEB. 17, 1908.

919,909.

Patented Apr. 27, 1909.
6 SHEETS—SHEET 1.

A. H. MEECH.
COMPOUND AIR COMPRESSOR.
APPLICATION FILED FEB. 17, 1908.

919,909.

Patented Apr. 27, 1909.
6 SHEETS—SHEET 3.

A. H. MEECH.
COMPOUND AIR COMPRESSOR.
APPLICATION FILED FEB. 17, 1908.

919,909.

Patented Apr. 27, 1909.
6 SHEETS—SHEET 4.

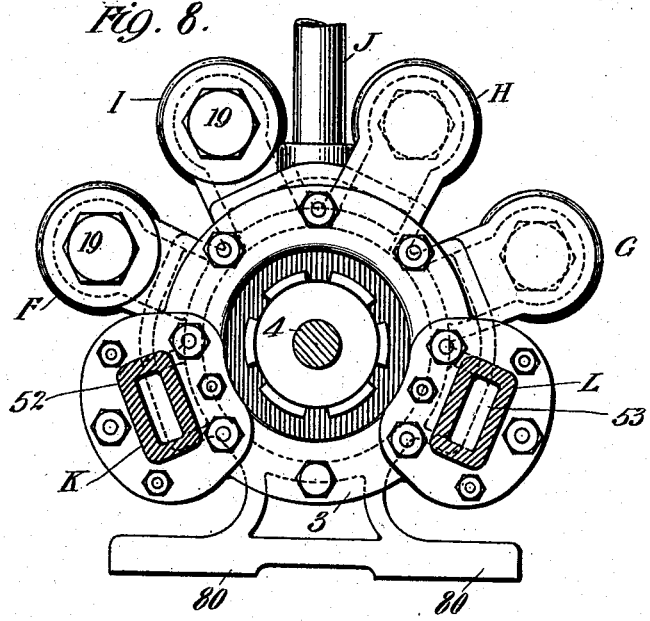
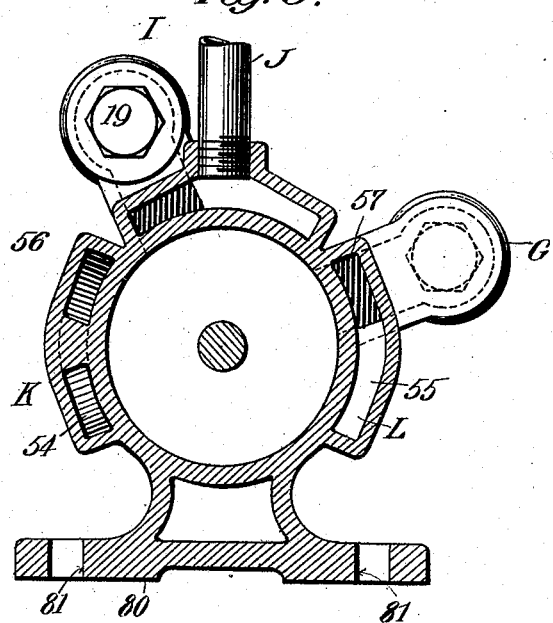

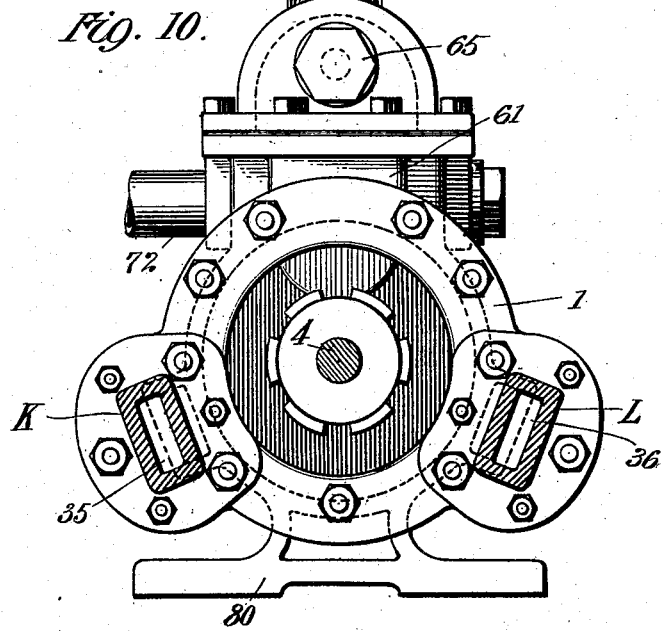
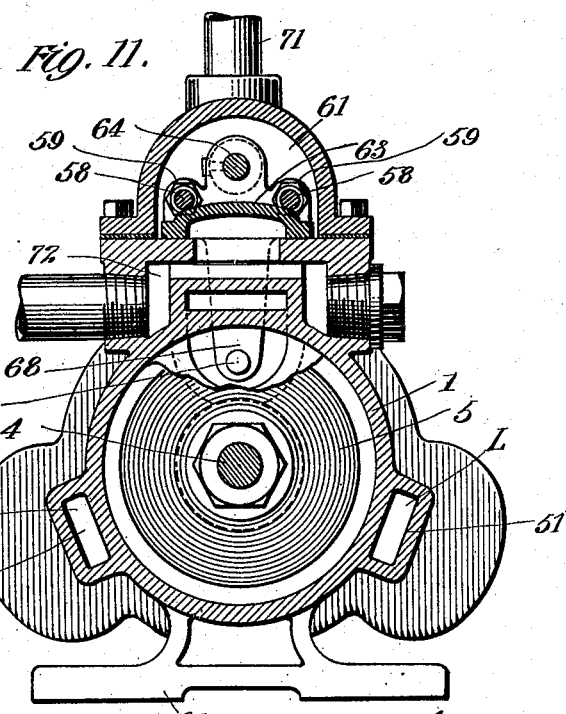

UNITED STATES PATENT OFFICE.

ALFRED H. MEECH, OF CHATHAM, NEW YORK.

COMPOUND AIR-COMPRESSOR.

No. 919,909.   Specification of Letters Patent.   Patented April 27, 1909.

Application filed February 17, 1908. Serial No. 416,167.

*To all whom it may concern:*

Be it known that I, ALFRED H. MEECH, a citizen of the United States, residing at Chatham, in the county of Columbia and State of New York, have invented certain new and useful Improvements in Compound Air-Compressors, of which the following is a full, clear, and exact description.

My invention relates to a construction of air pump or compressor, and more particularly a form of compound air compressor having a pair of cylinders in alinement with and directly operated by an intermediate steam cylinder.

In operating elevators, air-brake systems, refrigerating plants, and pneumatic power transmission systems, the economical and efficient compression of the air is a factor of prime importance. All air pumps in common use operate on substantially the same general principles, being in most cases compound-acting, and directly driven by the steam piston which constitutes a source of power, to secure greater thermo-dynamic and mechanical efficiency. Different pumps, however, vary widely in the actual results achieved, due to various minor features of construction and details of operation, such as sharp and effective steam cut-off, freely opening valves, minimum clearance space, and general rigidity and compactness of construction and form.

It is the purpose of my present invention to improve these various matters of construction, and also improve the general method of operation and the manner in which the air is controlled in its passage to and from and between the cylinders.

Figure 1:
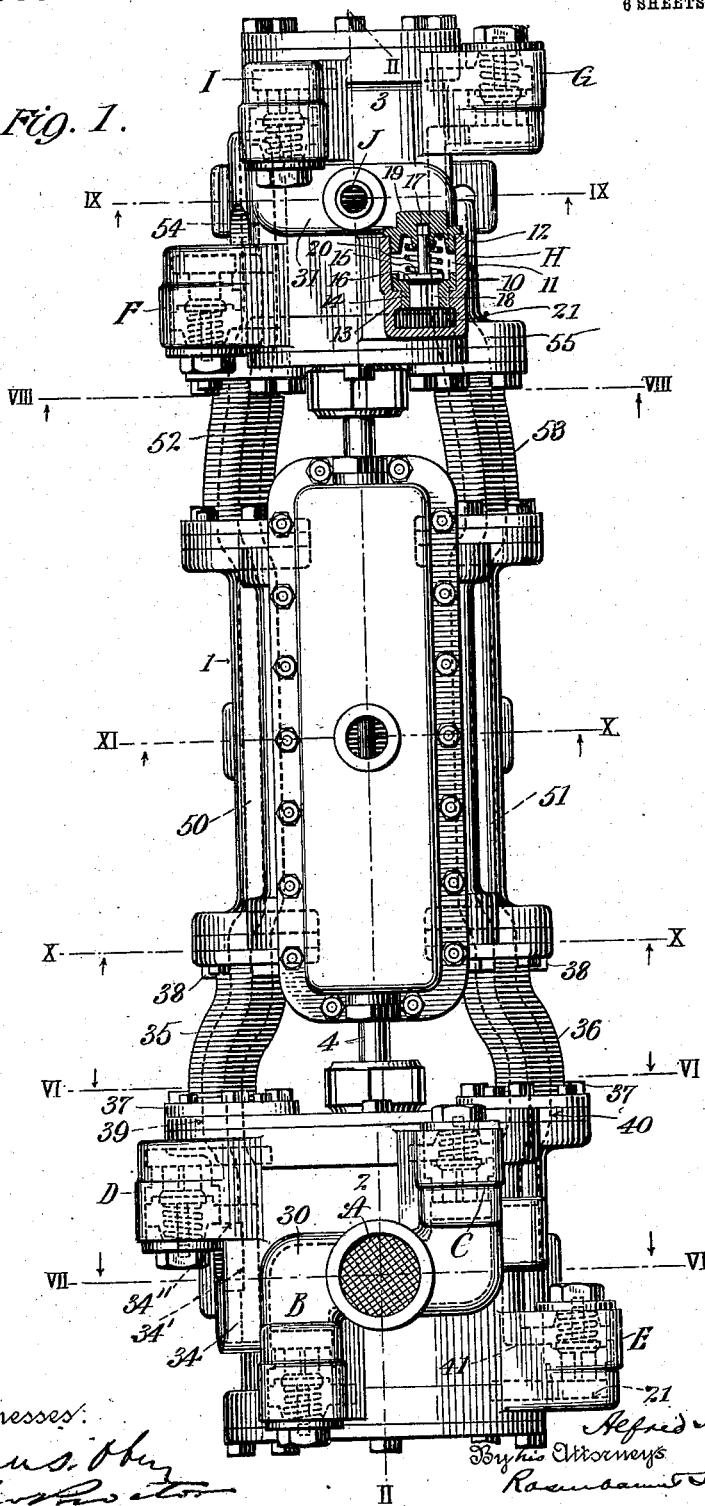
Figure 2:
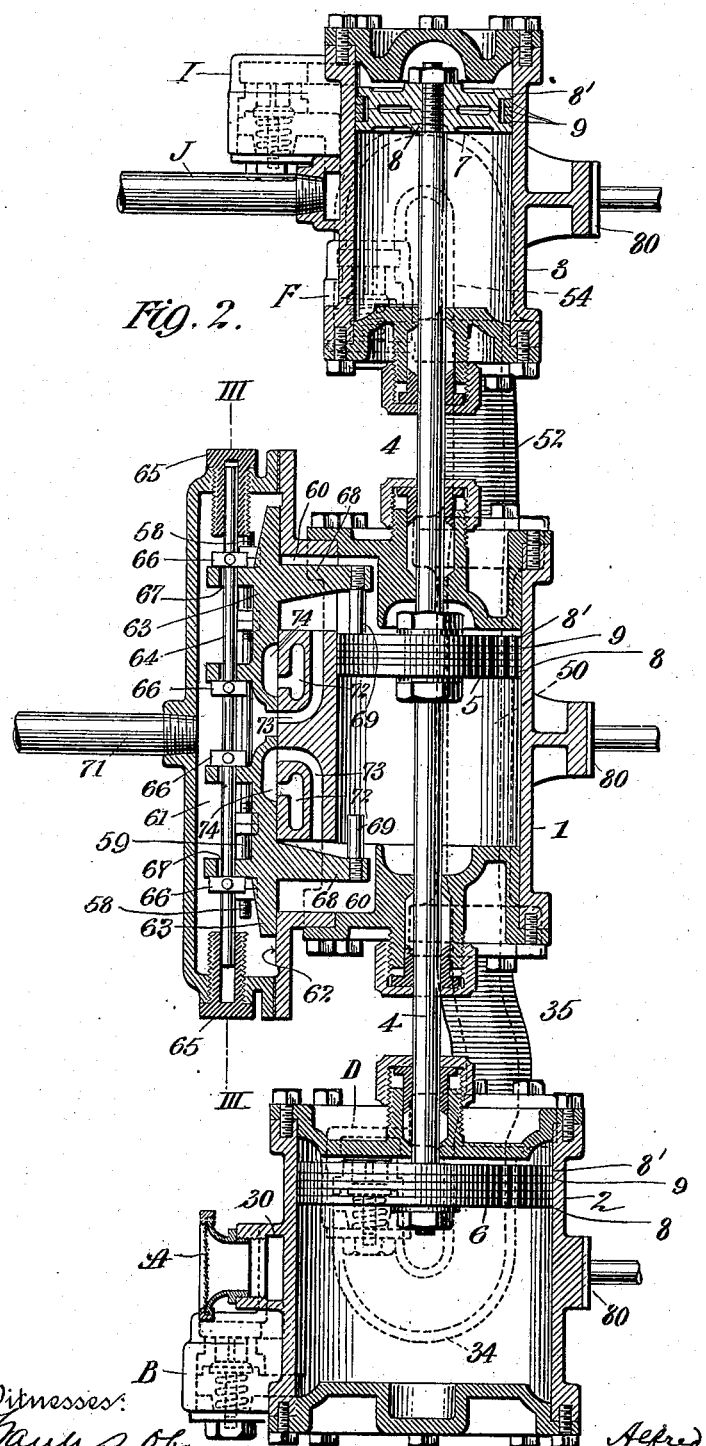
Figure 3:
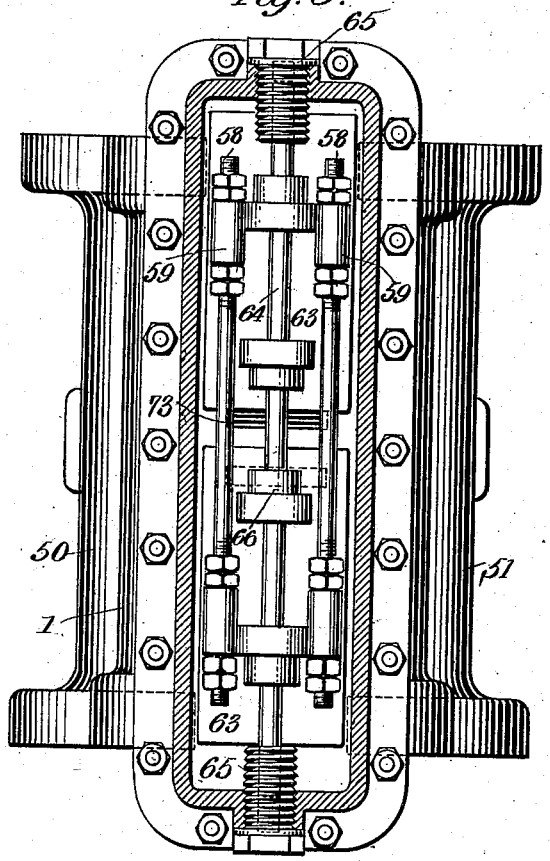
Figure 5:
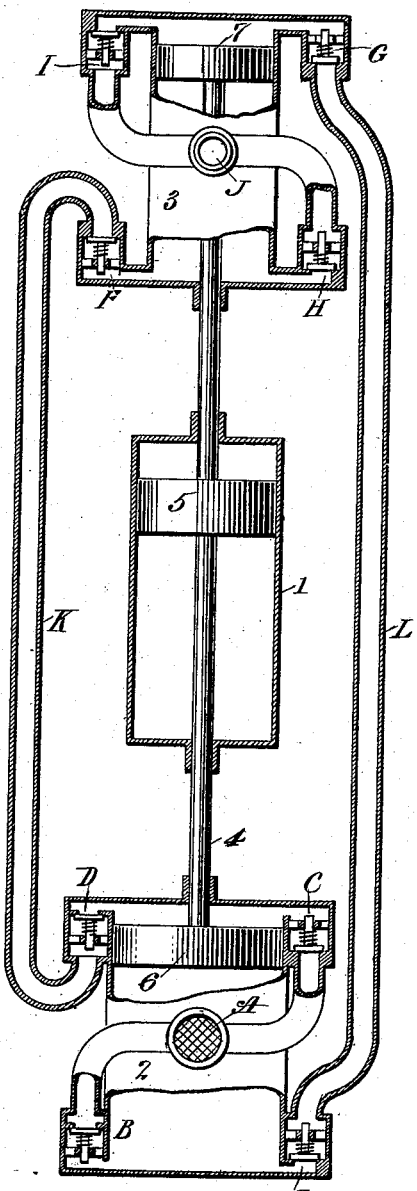
Figure 4:
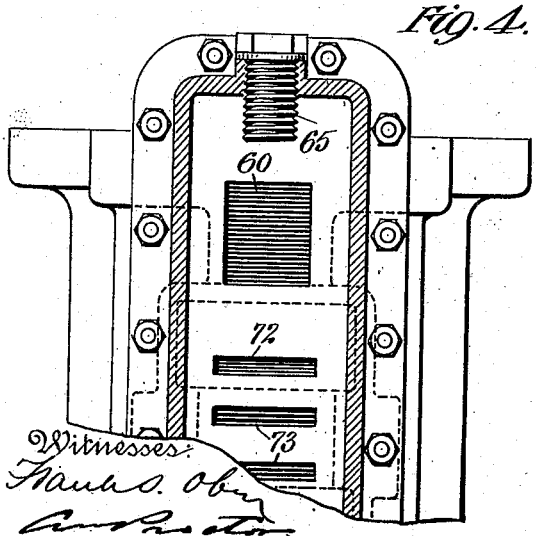
Figure 6:
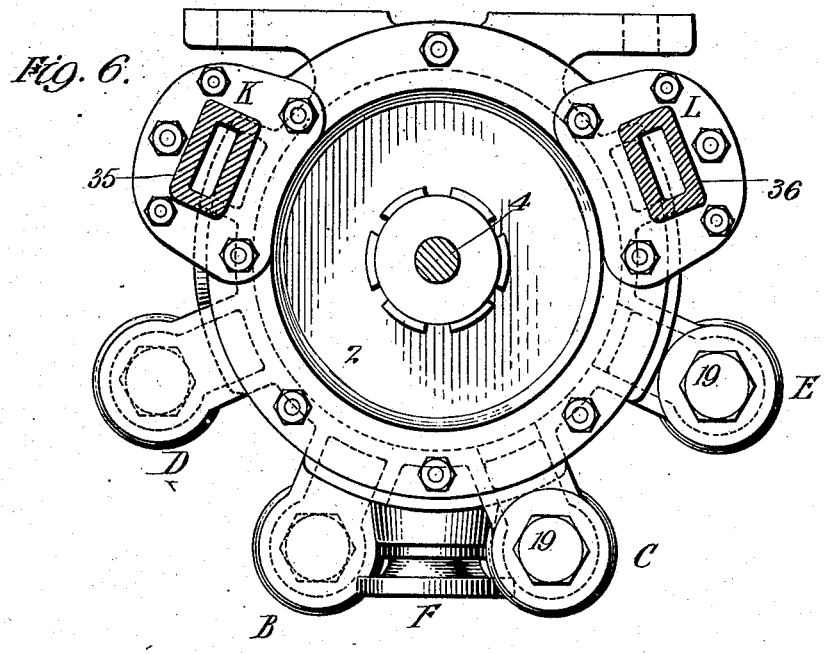
Figure 7:
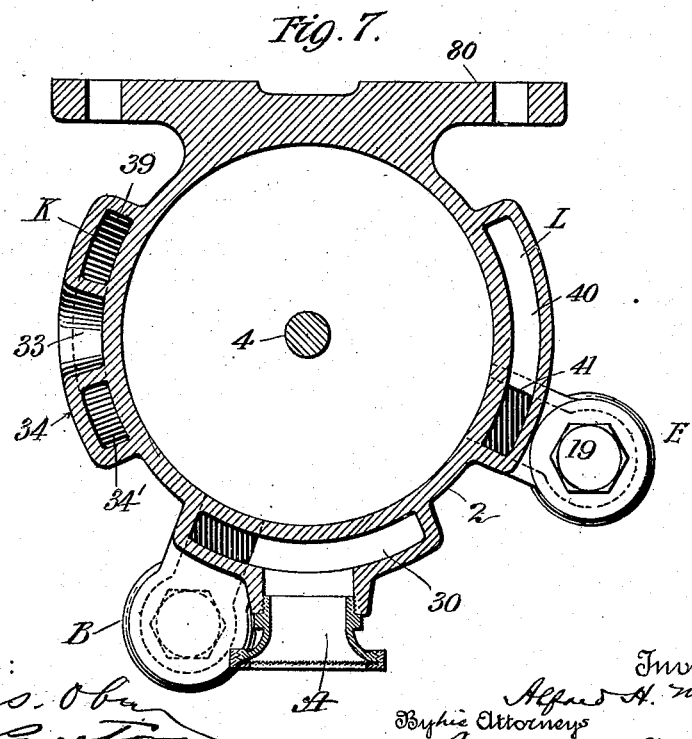

In the drawings: Figure 1 is a front view of a compound air pump or compressor embodying the principles of my invention; Fig. 2 is a vertical sectional view on the line II—II of Fig. 1. Fig. 3 is a sectional view on the line III—III of Fig. 2 showing details of the steam chest. Fig. 4 is a similar fragmentary view in which the valve rod and valves are removed. Fig. 5 is a purely diagrammatic view illustrating the general scheme of the air valves and their connections. Fig. 6 is a sectional view on the line VI—VI of Fig. 1 looking in the direction of the arrows. Fig. 7 is a sectional view on the line VII—VII of Fig. 1 looking in the direction of the arrows. Fig. 8 is a section on the line VIII—VIII of Fig. 1 looking in the direction of the arrows. Fig. 9 is a section on the line IX—IX of Fig. 1 looking in the direction of the arrows. Fig. 10 is a section on the line X—X of Fig. 1 looking in the direction of the arrows. Fig. 11 is a section on the line XI—XI of Fig. 1 looking in the direction of the arrows.

Referring to the drawings in which like parts are designated by the same reference sign, 1 indicates the steam or power cylinder, and 2 and 3 are respectively the initial or low and final or high air compression cylinders. 4 denotes the common piston rod extending co-axially through all the cylinders, the cylinders being on a common axis. The piston rod 4 has a piston 5 within the steam cylinder, and additional pistons 6 and 7 respectively in the low and in the high air compression cylinders. These pistons may be constructed of a pair of disks or plates 8, 8′, bolted together and inclosing between them a plurality of packing rings 9. The various cylinders may of course be jacketed in any suitable or ordinary way, the steam cylinders with heat insulating material and the air cylinders with cooling jackets or ribs of the ordinary sort. These features being of the ordinary construction, constitute no part of my invention and are omitted from the drawing to reduce the complexity of the showing.

Before considering the details of construction of the air valves, etc., I will describe briefly the main plan or layout of their operation, reference being particularly had to Fig. 5. A is the inlet pipe where the air first enters the system. From here the air passes directly through the valves B and C to the respective ends of the cylinder 2. The valves B and C open toward or into the cylinder so that they admit air to the respective ends thereof at each up and down stroke of the piston 6. D and E indicate additional valves opening outward from the ends of the cylinder 2 and communicating with pipes K and L. It is obvious that air will be impelled outward through these valves and into the pipes K and L on the strokes alternating those which operate valves B and C. The pipe K leads upward to the cylinder 3 and delivers into the lower end thereof, through the valves F opening inward. The pipe L enters the upper end of the cylinder 3 through the valve G also opening inward or into the cylinder. J indicates the outlet or delivery pipe communicating with the valves H and I at the respective ends of the cylinder 3. The valves H and I open outward from the cylinder into their delivery pipes. The capacity of the cylinder 2 is considerably greater than that of the cylinder 3, depending on the range through which the low-pressure cylinder and the high-pressure cylinder are adapted to work in the pumping or compressing operation.

In operation, air is drawn into one end of the cylinder 2, for example, the upper end, on the down stroke of the piston 4, and this air is impelled outward into the pipe K on the up stroke of the piston. But at the same time the piston 6 is moving upward impelling air into the pipe K; the piston 7 is also moving upward providing a space in the upper cylinder to receive the air in the pipe K. At the end of the up stroke, all of the air initially contained in cylinder 2 has been compressed into the cylinder 3, and the pressure is elevated in inverse proportion to the capacities of the respective cylinders. On the return or down stroke of the piston 6, air is finally ejected through the delivery opening J, the pressure being still further elevated to a degree only limited by the power of the steam cylinder and the clearance spaces at the ends of the piston stroke. In practice, the total work of the compression, would, of course, be distributed as equally as possible between the two cylinders. Precisely the same cycle of operations occurs at the lower end of the cylinder 2 and the upper end of the cylinder 3, except that it is the up-stroke which initially sucks in a charge in cylinder 2 and finally expels the compressed gases from the cylinder 3, and the down stroke which compresses the gases from cylinder 2 to cylinder 3. This tranfer occurs through the pipe L in exactly the same way as that already described in connection with the pipe K.

I will now refer to the various details of the actual construction, reference being had to the other figures of the drawing in which the valves corresponding to those diagrammatically illustrated in Fig. 5, are broadly designated by the same reference characters.

The construction of all the air valves is substantially the same in both the cylinders and is particularly illustrated in Fig. 1 (see valve H). In every case there is provided a protuberance 10 extending laterally at an appropriate point on the body of the cylinder, and having an internal chamber or cavity 11 open at one end 12. There are four protuberances 10 on each air cylinder, and I arrange them to project each in a different radial direction on the wall of its cylinder, as particularly shown in Figs. 6 and 8. The purpose of this arrangement is to permit the valve within each protuberance to be inspected through the opening at the end thereof without interference from the remaining protuberances. It is evident that this result is efficiently secured by the expedient of having the protuberances all extend in different radial directions on the cylinder wall so that they are considerably out of vertical alinement with one another.

13 indicates a reduced portion of the cavity or chamber 11 which is internally threaded to receive the removable valve seat 14.

15 indicates the valve member, having a conical portion 16 engaging the seat 14, and an upwardly projecting stem 17.

18 denotes fins or ribs extending downward from the valve member 16 and serving to guide the same against its seat.

19 indicates a cap screwed into the threaded portion 12 of the valve protuberance 10 and which serves the double purpose of guiding the stem 17, and forming an abutment for a spring 20 which keeps the valve member pressed against its seat. It will be evident that this construction permits the removal, not only of the valve member, but of its seat as well, at all times, without interfering with the rest of the mechanism in any way. In fact, the valves may be removed and inspected or renewed while the compressor is in operation. The valve 15 separates the upper or main portion of the valve chamber or cavity 11 from the inner end portion 21, the valve opening away from said inner end portion 21 and into the main cavity 11. The inner cavity 21 therefore constitutes the inlet or intake chamber of the valve and is scored to extend directly into the adjacent end of the cylinder 3, the main cavity 11 being deflected to join the passage or pipe leading to discharge orifice J.

The valves B, C, H and I, are disposed at regions on the front of the compressor so as to be in convenient proximity to the inlet opening A and the discharge opening J respectively. These valves are connected with these respective openings by tubular passages 30 and 31 integral with the walls of the cylinder, being conveniently cored out when the cylinders are cast. The connections of the valve I with cylinder 3 and with the passage 31 are similar in all respects to the connections of the valves H already described. The connections of the valves B and C with their passage 30 and with the cylinder 2 are generally similar to those of valves H and I, except that it is the main cavities of the valves which communicate with the cylinder and the end cavities 21 which communicate with the passages 30, instead of vice-versa as with the valves H and I.

The valves D, E, F and G, are located more toward the sides of the machine, so as to communicate with the pipes K and L, which, in the present invention, serve a double function as air passages and supporting frame members. The disposition and arrangement of pipes K and L is best shown by the sections of Figs. 6, 7, 8, 9, 10 and 11, each of which cuts both of these pipes at points along its length. From Fig. 7, which is the lowermost section of Fig. 1, it will be noted that the pipe K is cored out integrally upon the wall of the cylinder 2 and curves around, as shown at 33, into a portion 34 extending upwardly and leading to the valve D. The duct or passage of the portion 34 is designated 34' and appears in dotted lines in Fig. 1, being deflected laterally at 34'' to join the main cavity of the valve D which is similar in all respects to the other valves. Fig. 6 shows the next cross-section above that of Fig. 7 and cuts the pipes or passages K and L between the lowermost cylinder and the steam cylinder. At this plane, these pipes or passages are in the form of short, separate removable sections 35 and 36 having flanges at 37 and 38, so as to be bolted to the adjoining cylinders. The passages or cavities of the sections 35 and 36 join and form extensions of corresponding passages or cavities 39 and 40 of which 39 extends downwardly along the side of the cylinder to the section of Fig. 7 where it is particularly shown, and has already been previously referred to. The passage 40 also extends downward along the side of the cylinder to the section of Fig. 7 where it is also particularly shown. At the section of Fig. 7, the passage 40 is directed laterally, which accounts for its apparent considerable width in this figure. At its termination, it joins an opening 41 which communicates directly with the main cavity of the valve E. The intake cavity 21 of the valve E communicates directly with the adjacent end of the cylinder 2 in a manner similar to that of the valve D.

The passages K and L are merely cored to extend along the wall of the steam cylinder, as shown at 50 and 51 (see particularly Fig. 11). At the upper end of the steam cylinder, these passages join flanged pipe sections 52 and 53 similar to the sections 35 and 36 already described. These in turn are bolted to the upper cylinder at points communicating with cavities 54 and 55. The cavities 54 and 55 are particularly illustrated in Fig. 9 and the arrangement and disposition of these cavities in the upper cylinder is quite similar to that of the cavities or passages 39 and 40 of the cylinder 2 already described. The passage or cavity 54 extends upwardly and curves around at 56 where it leads into the end or intake cavity of the valve F. The main cavity of the valve F communicates with the lower end of the cylinder 3. In like manner, the passage 55 is extended laterally at the section of Fig. 9 which accounts for its breadth in this figure and joins the intake end 57 of the valve G. The main cavity of the valve G communicates with the upper end of the cylinder 3.

The above practical construction and arrangement of the various air valves and their connecting passages is exactly like the diagrammatic representation of Fig. 5 in the general scheme or operation, so this need not be considered in detail with respect to the actual construction.

The construction of the steam cylinder 1 is particularly illustrated in Figs. 2, 3, 4 and 11. The body of the steam cylinder has wide openings 60 at its respective ends and which communicate with the valve chest 61. The valve chest is made quite long with a flat face 62 adjacent to the cylinder. 63 indicates slide valves of which two are provided to slide upon the surface 62 and coöperate with ports therein. Two slide valves 63 are controlled in their to and fro movement by a valve rod 64 to which they are both connected, and which is guided in the bushings 65 at the ends of the valve chest. The slide valves are held to the valve rod by collars 66, but which have a slotted engagement 67 therewith, which construction prevents any relative longitudinal movement of the valves on the rod, but permits a slight lateral movement, so that the valves may always ride upon the surface 62, regardless of wear. Each slide valve has a horn or projection 68 extending into the cavities 60 and into the bore of the cylinder 1. Within the port of the cylinder 1 and in the path of the movement of the piston 5, these horns or protuberances 68 have pins 69 which are impinged against by the piston in its movement. It is evident that the upper pin 69 will be engaged at the limit of upward movement of the piston 5 and correspondingly move the two slide valves 63 upward. The lower pin 69 will be engaged at the lower limit of movement of the piston 5 and will correspondingly impel the two slide valves 63 downward. In this way, the slide valves are constrained to move at the end of each piston stroke. In order to insure the two slide valves 63 moving in absolute rigidity together at all times, I employ connecting threaded rods 69 passed through lugs 68 on the valve members and securely bolted thereto. This arrangement permits an adjustment of the two valves toward and from one another whenever desired.

The steam chest communicates with a source of steam pressure 71 in the usual way, and the surface 62 on which the slide valves move has exhaust ports 72 and inlet ports 73 which communicate with the respective ends of the cylinder 1. The slide valves 63 are of generally D-type with D-shaped cavities 74 which are of sufficient size to lap over adjacent ports 72 and 73, so as to connect them. The motion of the valve rod 64 between its bushings 65 is sufficient, so that each of the slide valves 63 may move from a position where it connects ports 72 and 73 to a position where this communication is broken, and the end of the port 73 is opened to the steam pressure in the steam chest. In the relation shown in Fig. 2, the upper slide valve is in a position to uncover the inlet port to the upper end of the steam cylinder, and the lower slide valve connects the port at the lower end of the cylinder with the adjacent exhaust port 72. Accordingly, the piston is in condition to move downward, which it is about to do.

The distance of separation of the two slide valves 63 at the points adjacent their port engaging surfaces corresponds exactly to the distance of separation of the steam cylinder inlet ports 73. This is important or desirable, because it insures that there is only one position, corresponding to an infinitely narrow line, at which the mechanism might be caught on a center; that is where steam would be admitted or cut-off from both ends of the steam cylinder in equal degree. In practice, it is substantially impossible for this to occur, as there is always a slightly preponderating force on one side or the other which enables the machine to start up. It is important to have the adjustment made accurately in this way so that the machine will never be caught on a dead center. The arrangement of having separate slide valves 63, the separation of which can be exactly adjusted to and accorded to the separation of the ports 73 is also important, in that it insures the completion of the piston strokes to an exact point of termination before the reverse movement begins. This movement can be adjusted to suit the exact dimensions of the air cylinders, so that the clearance space is made a minimum therein. The form of the cylinder heads and the pistons of the air cylinders and also the steam cylinder is also adjusted to give the minimum possible clearance.

In use the compressor may, of course, be fixed to any suitable supporting frame. I have illustrated lugs or projections 80 on the rear thereof which may be bolted to any vertical wall or partition, they being provided with suitable bolt holes 81 for this purpose. This is a convenient practical disposition of the apparatus, because a firm wall or partition is generally available in all installations where air compressors are used, and this arrangement demands only a minimum amount of floor space to be occupied.

What I claim, is:—

1. In a compound air pump or compressor, a pair of cylinders having rigidly connected pistons, and pipe connections for admitting the air compressed at each stroke in one cylinder to the other cylinder during a suction stroke thereof, said pipes being cored on the walls of the cylinders for the portions of their length immediately adjacent to said cylinders, said core pipes terminating in flanged portions coinciding in plane with the ends of the cylinders and said pipe connections also including separate sections intermediate the cylinders and having flanged ends adapted to be bolted to the flanged pipes of the cylinders whereby the latter are rigidly connected together.

2. In a compound air pump or compressor, a pair of air cylinders and an intermediate steam cylinder, all having rigidly connected pistons, one air cylinder having outlet valves at its respective ends, and the other air cylinder having inlet valves at its respective ends, and a pair of separate pipe connections respectively joining the valves at the near ends and at the remote ends of the cylinders, additional inlet valves at the respective ends of the first described cylinder, and additional outlet valves at the respective ends of the last described cylinder, said valves opening in directions parallel to the movements of said pistons and arranged out of vertical alinement with one another whereby they are separately adjustable.

3. In a compound air pump or compressor, a pair of air cylinders and an intermediate steam cylinder, all having rigidly connected pistons, one air cylinder having outlet valves at its respective ends, and the other air cylinder having inlet valves at its respective ends, and a pair of separate pipe connections respectively joining the valves at the near ends and at the remote ends of the cylinders, additional inlet valves at the respective ends of the first described cylinder, and additional outlet valves at the respective ends of the last described cylinder, said valves being inclosed in laterally extending protuberances on the walls of the cylinders, the valves moving in directions parallel to the movements of the pistons, and out of vertical alinement with one another, said protuberances having removable portions whereby the valves can be inspected and removed.

In witness whereof, I subscribe my signature, in presence of two witnesses.

ALFRED H. MEECH.

Witnesses:
FRANK S. OBER,
WALDO M. CHAPIN.